No. 671,944. Patented Apr. 9, 1901.
J. W. SUNDERLAND.
ROTARY ENGINE.
(Application filed Oct. 21, 1899. Renewed Aug. 31, 1900.)
(No Model.) 5 Sheets—Sheet 1.
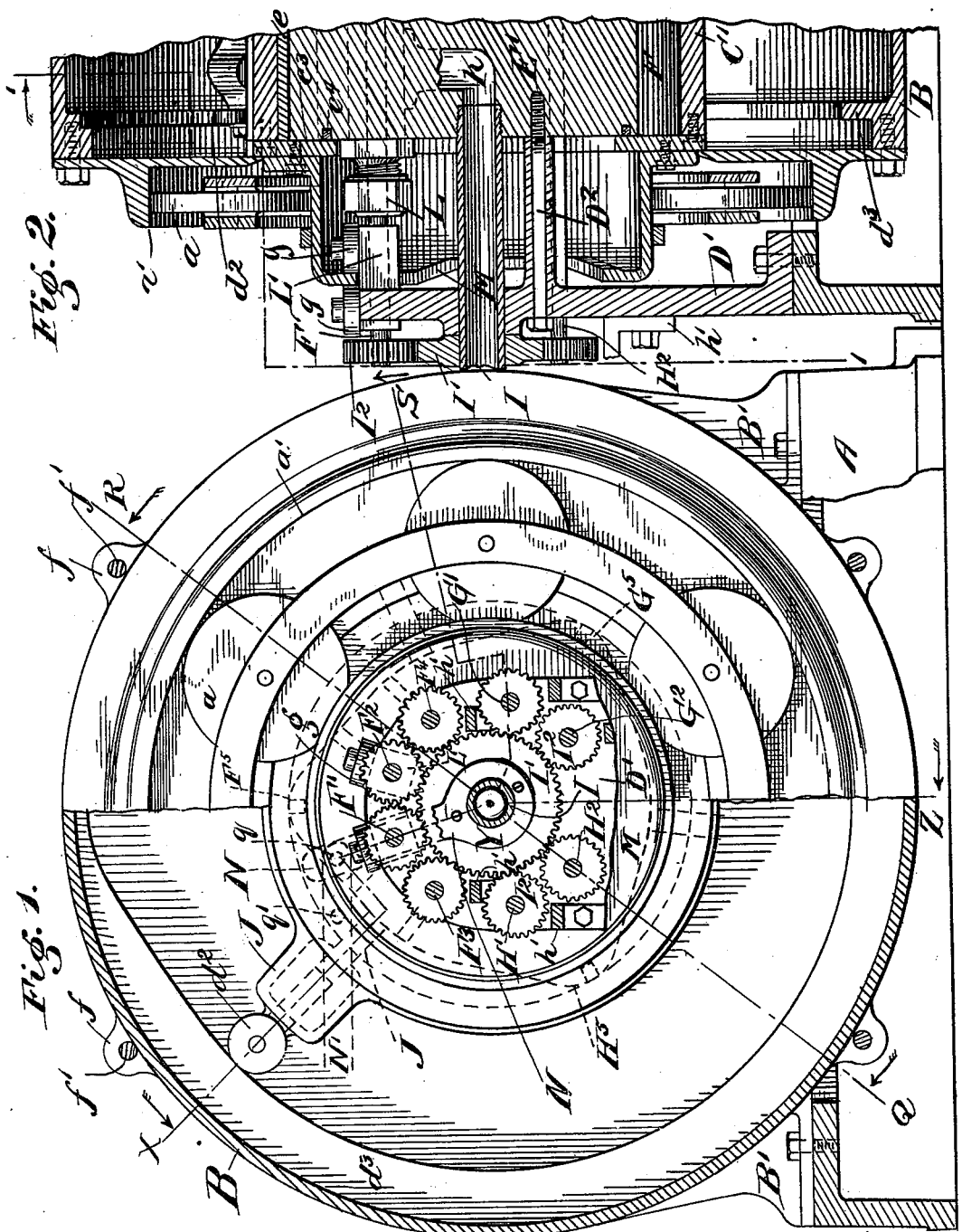

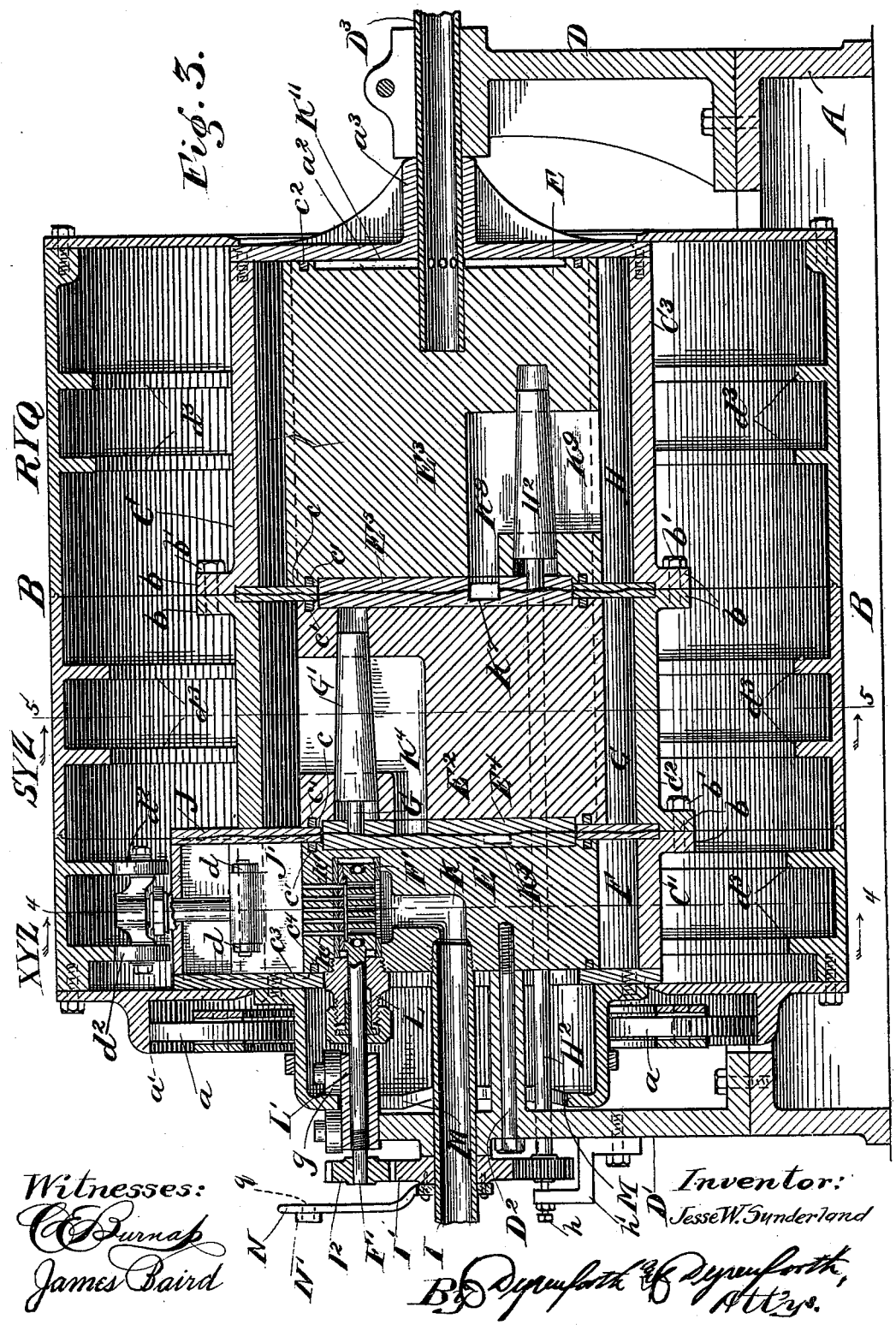

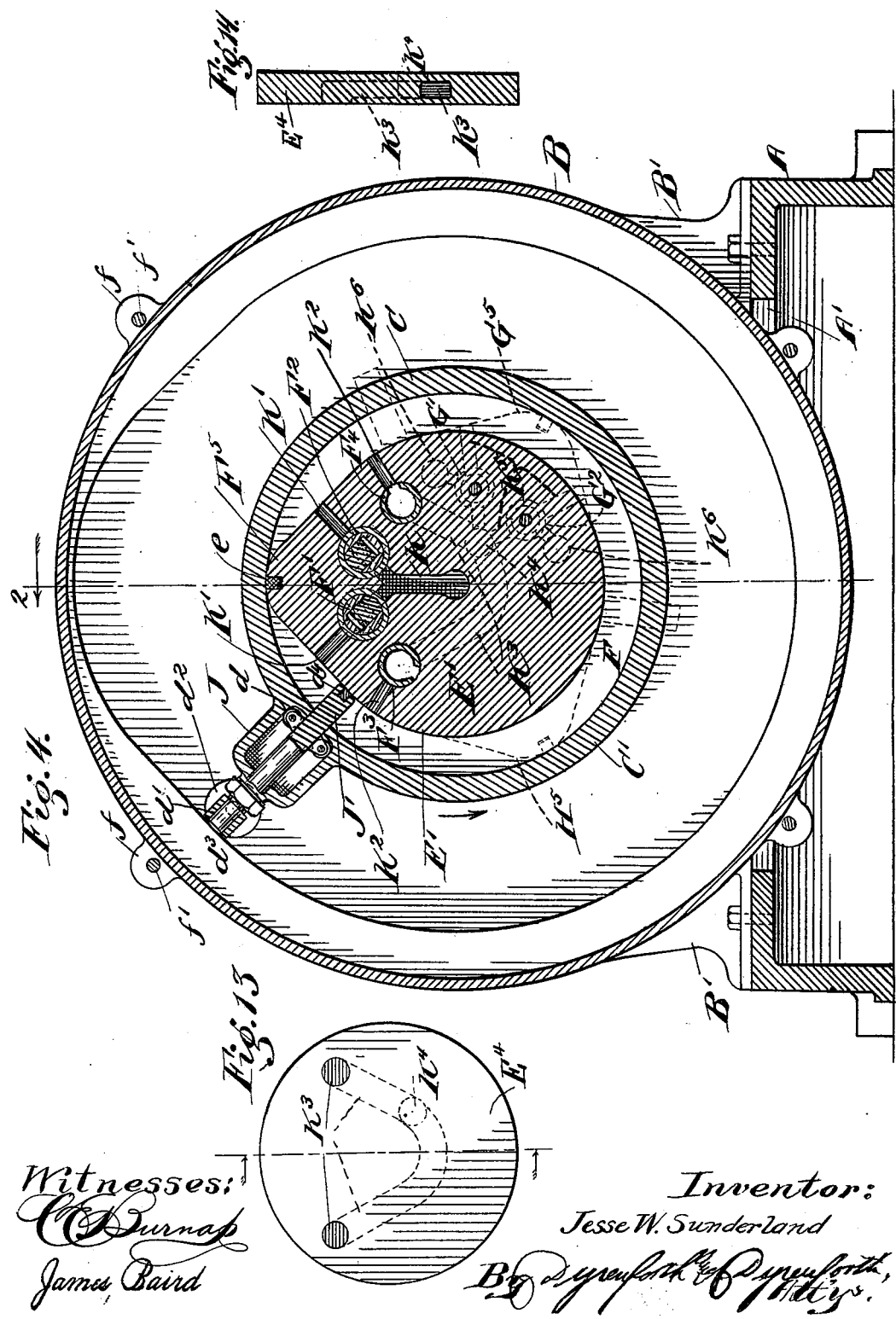

No. 671,944. Patented Apr. 9, 1901.
J. W. SUNDERLAND.
ROTARY ENGINE.
(Application filed Oct. 21, 1899. Renewed Aug. 31, 1900.)
(No Model.) 5 Sheets—Sheet 4.
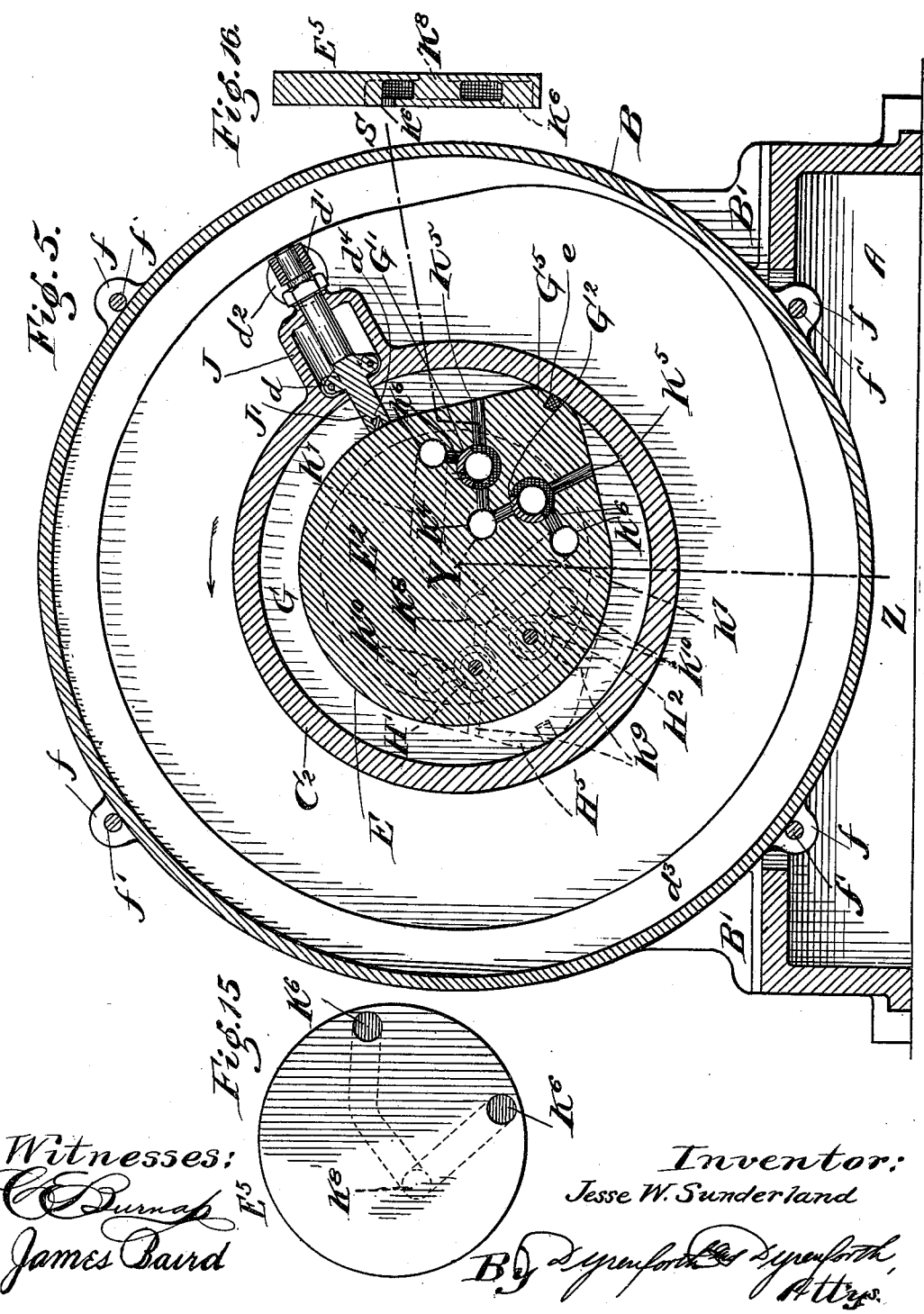
Witnesses:
C. E. Burnap
James Baird
Inventor:
Jesse W. Sunderland
By Dyrenforth & Dyrenforth,
Attys.

No. 671,944. Patented Apr. 9, 1901.
J. W. SUNDERLAND.
ROTARY ENGINE.
(Application filed Oct. 21, 1899. Renewed Aug. 31, 1900.)
(No Model.) 5 Sheets—Sheet 5.
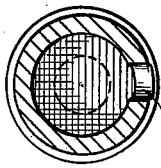
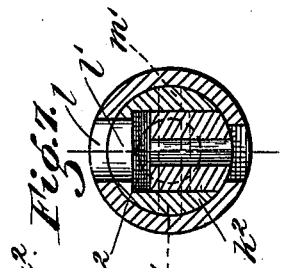
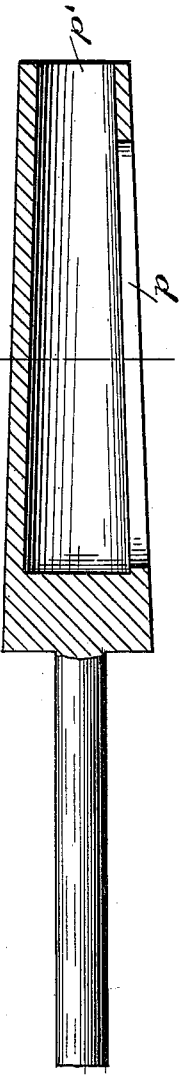
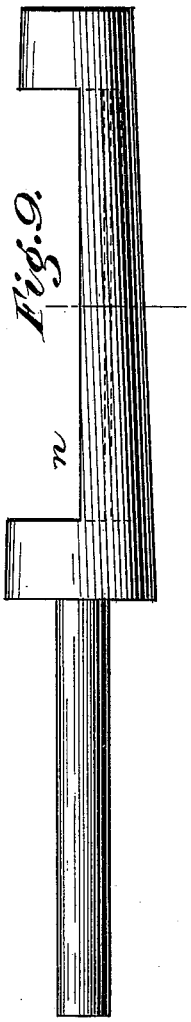
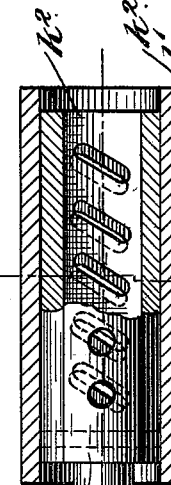
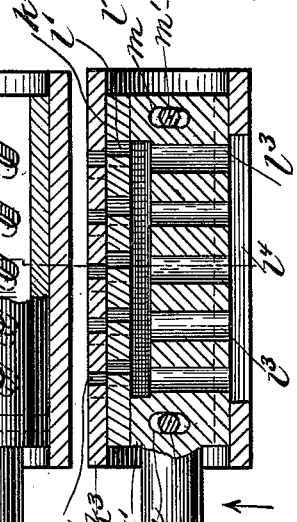
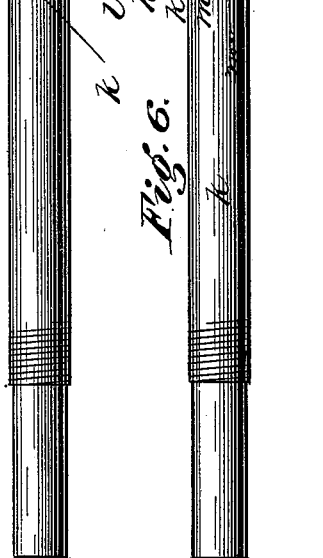
Witnesses:
C. E. Burnap
James Baird
Inventor:
Jesse W. Sunderland
By Dyrenforth & Dyrenforth,
Att'ys.

UNITED STATES PATENT OFFICE.

JESSE W. SUNDERLAND, OF CHICAGO, ILLINOIS, ASSIGNOR OF ONE-HALF TO A. J. McDUFFEE, OF SAME PLACE.

ROTARY ENGINE.

SPECIFICATION forming part of Letters Patent No. 671,944, dated April 9, 1901.

Application filed October 21, 1899. Renewed August 31, 1900. Serial No. 28,721. (No model.)

*To all whom it may concern:*

Be it known that I, JESSE W. SUNDERLAND, a citizen of the United States, residing at Chicago, in the county of Cook and State of Illinois, have invented a new and useful Improvement in Rotary Engines, of which the following is a specification.

My invention relates particularly to an improvement in that class of rotary engines in which a central stationary part is provided with admission and exhaust passages and with an abutment or abutments confining the steam in one direction, and an inclosing rotary part is provided with movable abutments or piston members against which the steam acts to produce rotation.

My object is to provide an engine of this class of generally improved construction, particular attention being paid to the features of reversibility, multiple expansion, and positive control of steam admission, both as to an absolute cut-off for expansion purposes and as to automatic regulation of the quantity of steam admitted under varying working conditions.

In the accompanying drawings my invention is shown embodied in the form of a reversible triple-expansion engine having a stationary core provided with peripheral stationary abutments and provided also with ports and valves, which core is surrounded by a rotating casing or piston internally flanged or ribbed to afford a series of expansion-chambers and provided with movable piston members for causing rotation, said piston being itself inclosed in a stationary casing provided interiorly with cams or guides for properly confining and directing said piston members in their movement about the central core.

In the drawings, Figure 1 is a view of the improved engine, partly in end elevation and partly in section, the section being mainly a half-annular one, taken as indicated at line 1 of Fig. 2; Fig. 2, a broken vertical longitudinal section at the admission end of the engine; Fig. 3, a composition of longitudinal sections of the three cylinders or expansion-chambers employed, taken in different planes and rotated to a common plane, the several component sections being lettered to correspond with lines on Fig. 1, indicating where each is taken; Figs. 4 and 5, vertical transverse sections on the corresponding lines of Fig. 3; Figs. 6 to 12, inclusive, details of the valves employed; Figs. 13 and 14, face and sectional views, respectively, of a disk separating the first two sections of the central fixed core; and Figs. 15 and 16, similar views of a disk, separating the last two sections thereof.

A represents a rectangular base provided with a rectangular opening A'; B, a fixed cylindrical casing, whose lower portion enters the opening A' and which is supported by lugs B'; C, a rotary casing or cylindrical piston supported at one end on a series of rollers $a$, which travel within an annular track $a'$, carried by one end of the casing B and supported at its opposite end by an end plate $a^2$, provided with a sleeve $a^3$; D D', end standards; E, a stationary central core supported by and fixedly secured to said standards through the medium of bolts $D^2$ at one end and a hollow shaft or trunnion $D^3$ at the opposite end; F G H, high, intermediate, and low pressure chambers, respectively; F' $F^2$, Figs. 3 and 4, admission-valves for the chamber F; $F^3$ $F^4$, exhaust-valves for the chamber F; G' $G^2$, valves acting interchangeably as admission and exhaust valves for the chamber G, according to direction of rotation of the engine; H' $H^2$, valves acting interchangeably as admission and exhaust valves for the chamber H, according to direction of rotation; I, an admission-pipe through which the motive fluid enters the engine; I', a central reversing-gear, journaled on the pipe I, and $I^2$ gears on the stems of the several valves and in mesh with the gear I, whereby all valves may be simultaneously moved in governing or reversing the engine.

Figs. 6 to 8, inclusive, show one of the high-pressure-chamber admission-valves; Figs. 9 and 10, one of the intermediate and low pressure chamber valves; Figs. 11 and 12, one of the exhaust-valves of the high-pressure cylinder, and Figs. 13 and 14 a disk used.

For convenience in the manufacture and the assembling of parts the core E is made in three sections E', E², and E³, these sections being separated by disks E⁴ and E⁵. The disks are shown broken in Fig. 3 to indicate a rotation to a common plane of the several sectional views taken at Fig. 1. The rotary piston is likewise formed in three sections C', C², and C³, connected by lugs b and bolts b'. Annular ribs or flanges c on the interior of the casing C project into corresponding grooves in the core E and are flanked by annular packing-strips c', thus separating the expansion-chambers from each other. At one end of the engine the annular end plate a², contacting with a packing-ring c², serves to confine the steam, and at the other end an annular plate c³, contacting with a packing-ring c⁴, serves to confine the steam. The cylindrical piston is provided with an enlargement J for each expansion-chamber (that for the third chamber not being shown) and with a radially-movable piston member J' within each of said enlargements. Figs. 4 and 5 show the members J' for the chambers F and G, respectively. These members move radially in grooves, (see dotted lines, Fig. 3,) which receive their lateral edges, and also project through slots in the bottoms of the enlargements into the expansion-chambers. They are provided with antifriction-rollers d to relieve friction, which would otherwise arise from unbalanced steam-pressure on the piston members. The members are further provided with stems, which project through the tops or outer walls of the enlargements and connect with the axles d' of small trucks or carriages provided with rollers d², Figs. 3 and 4. The rollers d² travel on ribs or cams d³ on the interior of the fixed casing B. Packing-strips d⁴ prevent passage of steam between the piston members and the peripheries of the central core-sections.

The core E is provided with enlargements or abutments F⁵ G⁵ H⁵, one for each expansion-chamber. (Shown in their relative positions in dotted lines in Fig. 1 and shown in section in full or in part in Figs. 2 and 3.) The enlargements preferably are at an angular distance of one hundred and twenty degrees from each other, as shown. The cams d³ of the casing B correspond in contour each to the particular section of the core E which it surrounds, the distance between the periphery of a core-section and its corresponding cams being a constant. Thus the piston member J' for each expansion-chamber is held in close contact with its core-section during rotation. The fixed abutments of the central core are provided with packing-strips e to prevent passage of steam.

Steam passes from the supply-pipe I to a passage K in the core-section E'. Branch passages K', guarded by the admission-valves F' F², lead to the periphery of said core-section at opposite sides of the abutment F⁵. Exhaust-passages K² lead from the periphery of the same core-section at opposite sides of the abutment F⁵ to the open-ended exhaust-valves F³ F⁴. The exhaust is from one or the other of these valves F³ F⁴ to confluent passages K³ (shown in dotted lines in Figs. 4, 13, and 14) in the disk E⁴, which passages meet to form an admission-passage K⁴ for the second expansion-chamber, Figs. 4 and 5, the passage K⁴ being provided (in the core-section E²) with branch passages K⁵, guarded by the closed-end valves G' G² and leading to the periphery of the core-section E² on opposite sides of the abutment G⁵. From the valves G' and G² lead exhaust-passages K⁶, which communicate with confluent passages K⁷, Fig. 5, in the disk E⁵, meeting in a common admission-passage K⁸ for the third expansion-chamber. Branch passages K⁹, controlled by the valves H' H², lead from the passage K⁸ to the periphery of the core-section E³ at opposite sides of the abutment H⁵, and, finally, exhaust-passages K¹⁰ lead from the valves H' H² to a common exhaust K¹¹, Figs. 3 and 5, in communication with the hollow shaft D³.

From a view of Fig. 4 it will be seen that the admission-valve F' and exhaust-valve F⁴ are open, while the admission-valve F² and exhaust-valve F³ are closed. At the same time the valve G', Fig. 5, closes the corresponding exhaust-port K⁶ and leaves the passage K⁵, which it guards, free to admit steam to the chamber G, while the valve G² closes the admission-passage K⁵, which it guards, and leaves a passage to the corresponding exhaust-port K⁶. At this time also the valve H², Figs. 3 and 5, is in position to admit steam to the chamber H, Fig. 3, and to close its own exhaust-port, while the valve H' is in position to close its port K⁸ against admission and to open its port K¹⁰ to permit exhaustion. When the engine is reversed, the valves F², G², and H' become the admitting-valves, while the valves F³, G', and H² become the exhausting-valves.

The outer casing B is conveniently formed in three circular sections, as shown, the sections being connected by lugs f and bolts f'.

The stems of the admission-valves F' and F² pass through stuffing-boxes L, as indicated in Fig. 3, and exterior to said boxes have threaded connection with the interior of longitudinally-slidable holders or sleeves L', preferably of angular exterior form and moving in corresponding recesses or grooves in the standard D'. Each sleeve L' is provided at its outer or upper side with cam-rollers g, which bear one against the inner surface and one against the outer surface of an annular cam M, secured to the face-plate c³ of the rotary piston, and of such shape as to move the valves longitudinally to admit steam for an instant at the valve which is set therefor and then cut off the supply during such portion of the revolution as may be desired. The remaining six valves are movable longitudinally merely to adjust for wear and are moved to the admission or exhaust position, as the case may be, by rotation on their axes. Said six valves (not including F' F²) are all preferably taper valves and are adjustably held by means of set-screws $h$, Fig. 3, passing through brackets $h'$, carried by the standard D', and bearing against the outer ends of the valve-stems.

Figs. 6 to 8, inclusive, show the construction of the admission-valves F' F². Each comprises, preferably, a stem $k$, having an enlarged inner end $k'$, provided with flat sides and top and a convex bottom surface, Fig. 7, a partial sleeve $k^2$, which receives said end and affords a continuation of said convex surface, and a valve-casing $k^3$ for receiving the composite head thus described. The casing $k^3$, which fits in a socket in the core-section E', Fig. 3, is supplied at its upper side with diagonally-extending slots $l$, which during admission, register with similar slots $l'$ in the partial sleeve $k^2$. The part $k'$ is provided adjacent to the openings $l'$ with a continuous passage $l^2$, which intersects a series of passages $l^3$, leading to a continuous passage $l^4$ at the lower part of the casing $k^3$. The part $k'$ is provided with vertical slots $m$, through which loosely pass pins $m'$, whose ends project beyond the sides of said part and into close-fitting perforations in the part $k^2$. This construction permits the steam to press the upper surface of the part $k^2$ or the true valve-surface firmly and evenly against the upper interior surface of the valve-casing $k^3$, and thus prevent leakage when the valve is in the cut-off position. The essence of this feature consists in the formation of the valve in two relatively movable parts, so that the valve-surface may move on the stem transversely thereof and yet move longitudinally with the valve.

Figs. 9 and 10 show the construction of the valves for the intermediate and low-pressure chambers. Each valve is simply a taper plug-valve having a cut-away or recess $n$ for steam passage.

Figs. 11 and 12 show the construction of the exhaust-valves of the first expansion-chamber. Each valve is of hollow taper form and is provided with a side ingress $p$ and end egress $p'$.

The central reversing-gear I' is provided with a reversing-lever N, which may, where desired—though ordinarily this is not required—be connected with governor mechanism and a variable cut-off be thereby provided. The hand-lever N is shown connected with a link N', which, in turn, may connect with governing mechanism of any suitable construction. (None shown.) The link is provided with two perforations $q$ $q'$, one of which is properly located for use when the lever N is in a position corresponding to a given direction of rotation and the other for use when said lever is in position corresponding to a reverse rotation.

The operation will be understood readily from the foregoing description and may be summarized thus: The lever N is set in position to admit steam intermittently to the engine through either the valve F' or the valve F², according to direction of rotation desired. The drawings show the valve F' in position to admit steam during a portion of each rotation of the piston and to cut off the steam during the remainder of the rotation, the rotary cam M serving to actuate the valve, as explained. The steam passes through the several expansion-chambers in the manner already described and escapes from the engine through the hollow trunnion D³. With the valves in the position shown the direction of rotation is as indicated by the arrows. The sizes of the several expansion-chambers are inversely proportional to the pressures for said chambers, as is common. When it is desired to reverse the engine, the lever N is moved to throw the valve F' to the non-admitting position, the valve F² to the admitting position, the valve F⁴ to the non-exhausting position, and the valve F³ to the exhausting position, and to rotate the valves of the second and third expansion-chambers, so that the present admission-valves shall act as exhaust-valves and the present exhaust-valves as admission-valves.

It will be understood that the admission of steam to the engine is controlled entirely by the valves F' and F², (or the one which happens to be in use,) and that these two valves only are intermittently moved by the cam M. The power may be taken from the rotary piston at any suitable location and in any suitable manner.

It may be added with reference to the use of governor mechanism in connection with the lever N that where the engine is used purely for traction purposes or for boat propulsion or in like situations a governor is not required. Where the engine is used purely as a motor, (for driving machinery, &c.,) a governor is required; but the engine under such conditions is seldom or never reversed. Where the engine is changed from traction purposes to purely motor purposes, and vice versa, the governor mechanism is connected and disconnected at will. As a matter of fact, conditions very seldom arise where it is desired to govern the engine in both directions of rotation, so that practically it is seldom, if ever, necessary to change the point of connection of the lever N with the link N'.

It may be observed that the central core E acts as a combined steam-chest and valve-chamber provided with stationary steam-confining abutments lying between different transverse planes and that the movable abutments or piston members of the rotary piston move with their inner ends against the several core-sections corresponding to the several expansion-chambers, the peripheries of said sections thus acting as cam-surfaces.

Changes in details of construction within the spirit of my invention may be made. Hence no limitation is to be understood from the detailed description given except as shall appear from the appended claims. Any suitable motive fluid may be employed.

What I claim as new, and desire to secure by Letters Patent, is—

1. In a rotary engine, the combination with a suitable frame, of a fixed central part comprising steam-chest and valve-chamber and provided peripherally with an abutment, a rotary piston inclosing said central part provided with guides for a movable piston member, a radially-movable piston member in said guides contacting at its inner end with the periphery of said central part, antifriction-rollers or the like between said piston member and its guides, a stationary outer casing provided with a cam corresponding in contour to the periphery of said central part, and an antifriction member between the outer end of said piston member and said cam, substantially as and for the purpose set forth.

2. In a rotary engine, the combination with a suitable frame, of a fixed central part comprising steam-chest and valve-chamber and provided with an abutment, a rotary and longitudinally-movable valve in said valve-chamber, and governor connection regulating one movement of said valve and cam means regulating the other movement of said valve, substantially as and for the purpose set forth.

3. In a rotary engine, the combination with a suitable frame, of a fixed central part comprising steam-chest and valve-chamber and provided with an abutment, a rotary and longitudinally-movable valve in said valve-chamber provided with ports extending at an angle to the axis of the valve, governor connection for rotating the valve, and cam-actuated means for causing a longitudinal movement of the valve, substantially as and for the purpose set forth.

4. In a rotary engine, the combination with a suitable frame, of a fixed central part provided with admission and exhaust ports, a rotary piston inclosing said central part, and an admission-valve controlling said admission-port, said valve being of circular cross-section and provided with a part movable transversely of the valve, substantially as and for the purpose set forth.

5. In a rotary engine, the combination with a suitable frame, of a fixed central part provided with admission and exhaust ports, a rotary piston inclosing said central part, and an admission-valve controlling said admission-port, said valve comprising a partial sleeve provided with ports and an angular stem having pin-and-slot connection with said sleeve, substantially as and for the purpose set forth.

6. In a rotary engine, the combination with a suitable frame, of a fixed central part comprising steam-chest and valve-chamber and provided peripherally with an abutment, a rotary and longitudinally-movable valve in said valve-chamber provided with a projecting stem, a holder in which said stem is rotatably held, means for rotating said stem, a rotary piston inclosing said central part, a piston member connected with said rotary piston, and a cam connected with said rotary piston for moving said holder longitudinally, substantially as and for the purpose set forth.

7. In a rotary engine, the combination with a suitable frame, of a fixed central part comprising steam-chest and valve-chamber and provided peripherally with an abutment, a rotary piston including said central part provided with a valve-actuating cam, an abutment carried by the rotary piston against which the steam acts, a rotary and longitudinally-movable valve extending into said central part, means for rotating said valve, and connecting means between said valve and cam whereby the valve is moved longitudinally at each rotation of the piston, substantially as and for the purpose set forth.

8. In a rotary engine, the combination with a suitable frame, of a fixed central part comprising steam-chest and valve-chamber, a rotary piston inclosing said central part, an admission-valve in said central part provided with a projecting stem, a holder for said stem having internally-threaded connection with the stem, means for rotating said valve within said holder, and a cam carried by said rotary piston and having connection with said holder and serving to move the valve longitudinally, substantially as and for the purpose set forth.

9. In a rotary engine, the combination with a suitable frame, of a fixed central part comprising steam-chest and valve-chamber, a rotary piston inclosing said central part, an admission-valve in said central part provided with a projecting stem, a holder for said stem in which the stem is rotatably held, means for rotating said valve, a cam carried by said rotary piston, and antifriction-bearings between said cam and holder, substantially as and for the purpose set forth.

10. In a reversible rotary engine, the combination with a suitable frame, of a fixed central part comprising steam-chest and valve-chamber and provided with an abutment, a rotary piston provided with an abutment and provided also with a cam, two admission-valves controlling admission-ports leading to the periphery of said central part at opposite sides of its abutment, pinions on the stems of said valves, and a reversing-gear meshing with said pinions, substantially as and for the purpose set forth.

11. In a rotary engine, the combination with a suitable frame, of a fixed central part provided with an abutment, a rotary piston provided with an abutment, two admission-valves controlling admission-ports leading to the periphery of said central part at opposite sides of its abutment, two exhaust-valves controlling ports leading from the periphery of said central part at opposite sides of its abutment, pinions on the stems of said valves, and a reversing-gear meshing with said pinions for simultaneously throwing one set of admission and exhaust valves out of use and the other set into use whereby a reversal of the engine is secured, substantially as and for the purpose set forth.

12. In a rotary engine, the combination with a suitable frame, of a fixed central part provided with peripheral abutments lying between different transverse planes and at an angle to each other, a rotary piston inclosing said central part and forming therewith annular expansion-chambers, abutments carried by said rotary piston separated by an angular distance corresponding to the angular distance between the abutments of said central part, admission and exhaust ports for the first chamber, valves controlling said ports, ports leading from the exhaust-valves of said first chamber to said second chamber, and valves controlling said last-named ports, substantially as and for the purpose set forth.

13. In a rotary engine, the combination with a suitable frame, of a fixed central part provided peripherally with abutments lying between different transverse planes and at an angle to each other, a rotary piston inclosing said central part and forming therewith annular expansion-chambers, abutments carried by said rotary piston separated by an angular distance corresponding to the angular distance between the abutments of said central part, admission and exhaust ports for the first chamber, valves controlling said ports, ports leading from the exhaust-valves of the first chamber to the second chamber, exhaust-ports leading from the second chamber, and two valves controlling the ports leading to and from said second chamber and acting alternately as admission and exhaust valves according to the direction of rotation of the engine, substantially as and for the purpose set forth.

14. In a rotary engine, the combination with a fixed central part provided with admission and exhaust ports and with valves controlling said ports, of a rotary piston inclosing said central part provided internally with an abutment, an abutment for said central part coacting with said first-named abutment, means for rotatably supporting one end of said rotary piston, a series of rollers for supporting the opposite end of said rotary piston, and a fixed annular track within which said rollers move, substantially as and for the purpose set forth.

15. In a rotary engine, the combination of a casing B provided with cams $d^3$, a sectionally-constructed rotary piston C provided with inwardly-projecting flanges or ribs separating the expansion-chambers, a fixed central core provided with packing-rings with which said ribs contact and provided, also, with fixed abutments at an angle to each other and projecting into the several expansion-chambers, and admission and exhaust valves controlling the flow of fluid to and from the several chambers, substantially as and for the purpose set forth.

16. In a rotary engine, the combination with a suitable frame, of a fixed central core provided with an admission-pipe I, a reversing-gear journaled thereon, a rotary piston inclosing said core, means for separating the space between said core and cylindrical piston into a plurality of annular expansion-chambers, valves controlling the passages to and from said chambers and grouped about said reversing-gear, and pinions on said valves meshing with said reversing-gear, substantially as and for the purpose set forth.

JESSE W. SUNDERLAND.

In presence of—
D. W. LEE,
M. S. MACKENZIE.